Figure 1:
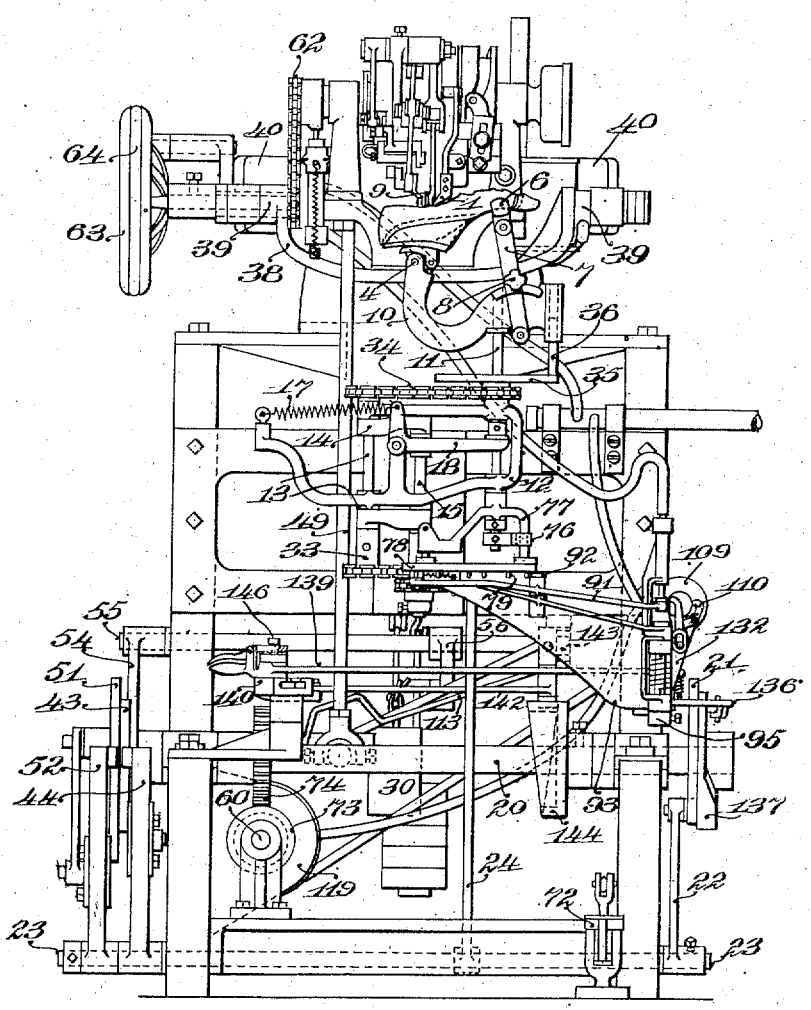

E. E. WINKLEY.
MACHINE FOR OPERATING UPON BOOTS AND SHOES.
APPLICATION FILED FEB. 17, 1906.

1,030,627.

Patented June 25, 1912.

12 SHEETS—SHEET 1.

Witnesses
Edward S. Day
Alfred H. Hildreth

Inventor
Erastus E. Winkley
by his Attorneys
Phillips Van Everen & Fish

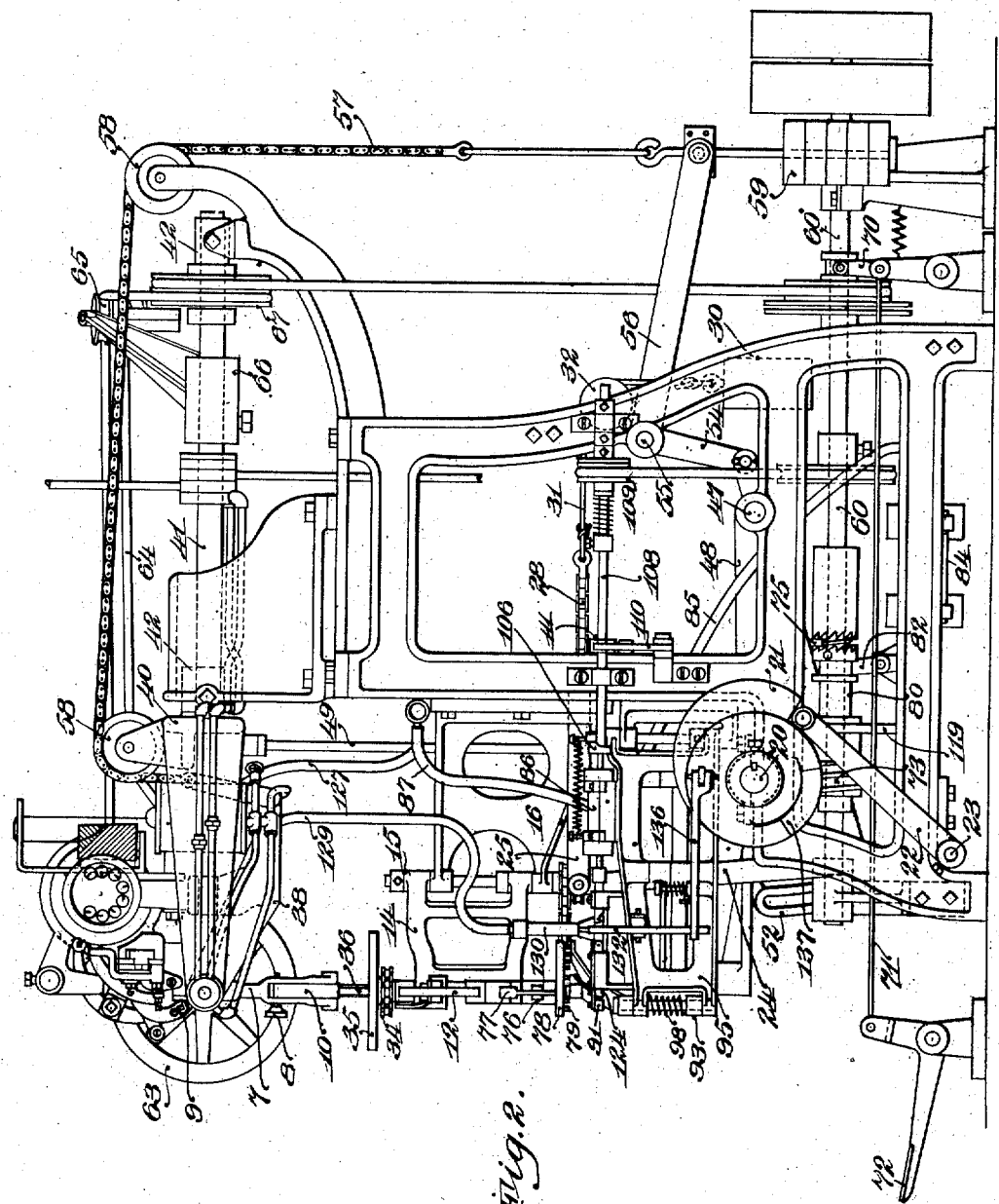

E. E. WINKLEY.
MACHINE FOR OPERATING UPON BOOTS AND SHOES.
APPLICATION FILED FEB. 17, 1906.

1,030,627.

Patented June 25, 1912.

12 SHEETS—SHEET 3.

Witnesses
Edward S. Day
Alfred H. Hildreth

Inventor
Erastus E. Winkley
by his Attorneys
Phillips Van Everen & Fish

E. E. WINKLEY.
MACHINE FOR OPERATING UPON BOOTS AND SHOES.
APPLICATION FILED FEB. 17, 1906.

1,030,627.

Patented June 25, 1912.

12 SHEETS—SHEET 6.

Witnesses
Edward S. Day
Alfred H. Hildreth

Inventor
Erastus E. Winkley
by his Attorneys
Phillips Van Everen & Fish

E. E. WINKLEY.
MACHINE FOR OPERATING UPON BOOTS AND SHOES.
APPLICATION FILED FEB. 17, 1906.

1,030,627.

Patented June 25, 1912.

12 SHEETS—SHEET 7.

Witnesses
Edward S. Day
Alfred H. Hildreth

Inventor
Erastus E. Winkley
by his Attorneys
Phillips Van Everen & Fish

E. E. WINKLEY.
MACHINE FOR OPERATING UPON BOOTS AND SHOES.
APPLICATION FILED FEB. 17, 1906.

1,030,627.

Patented June 25, 1912.

12 SHEETS—SHEET 8.

Witnesses
Edward S. Day
Alfred H. Hildreth

Inventor
Erastus E. Winkley
by his Attorneys
Phillips Van Everen & Fish

E. E. WINKLEY.
MACHINE FOR OPERATING UPON BOOTS AND SHOES.
APPLICATION FILED FEB. 17, 1906.
1,030,627.
Patented June 25, 1912.
12 SHEETS—SHEET 9.
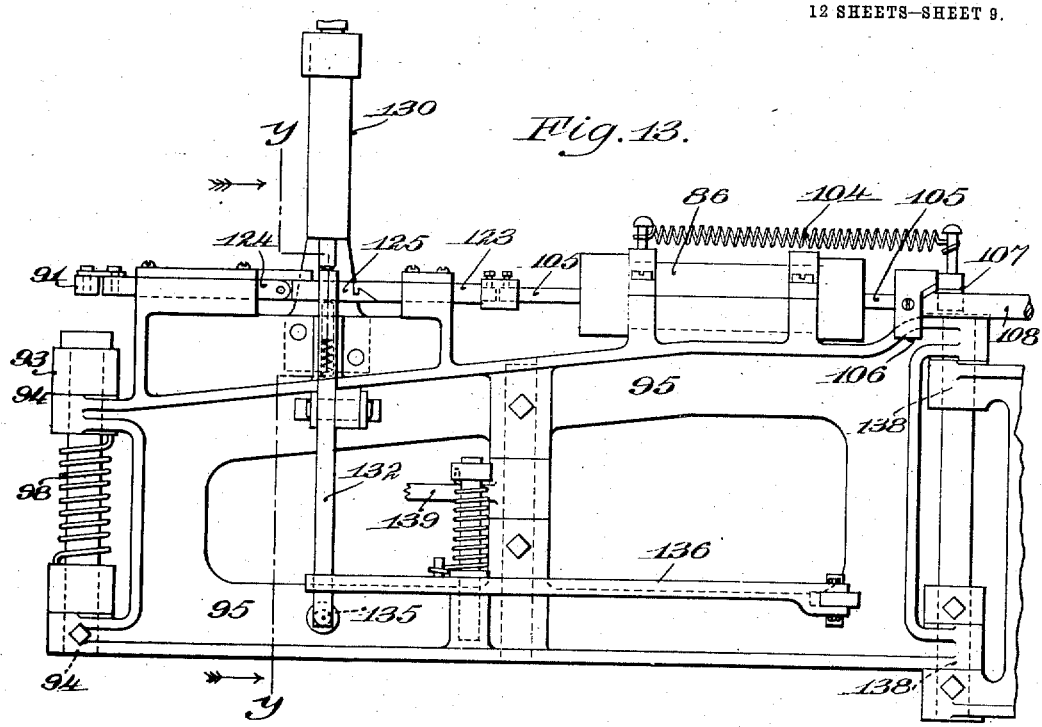
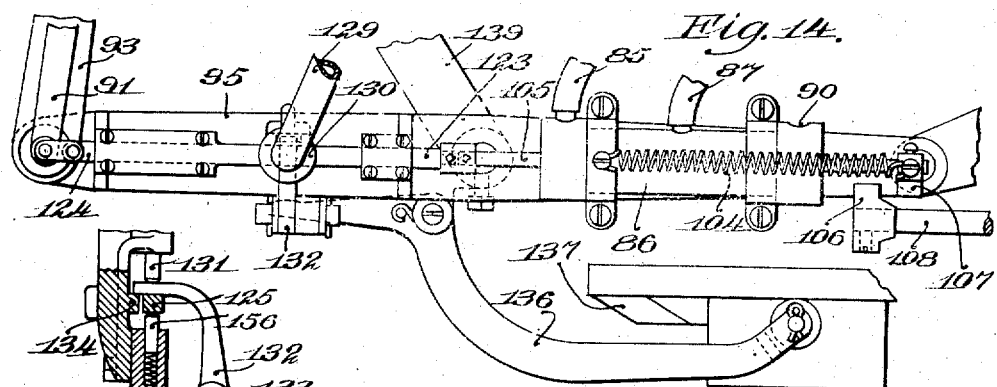
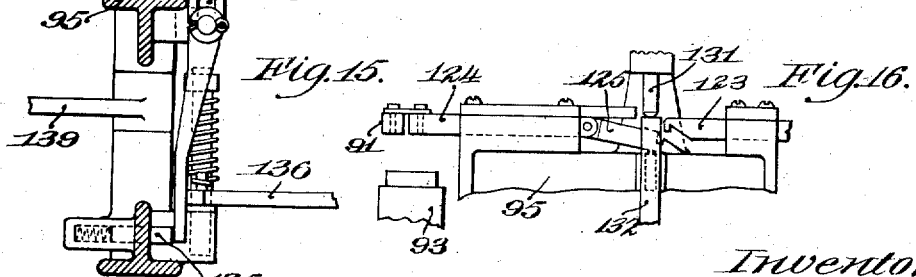
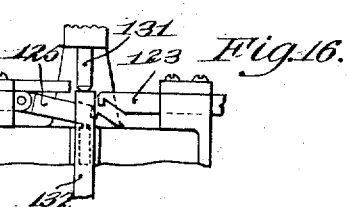
Witnesses
Edward S. Day
Alfred H. Hildreth
Inventor
Erastus E. Winkley
by his Attorneys
Phillips Van Everen & Fish E. E. WINKLEY.
MACHINE FOR OPERATING UPON BOOTS AND SHOES.
APPLICATION FILED FEB. 17, 1906.

1,030,627.

Patented June 25, 1912.

12 SHEETS—SHEET 10.

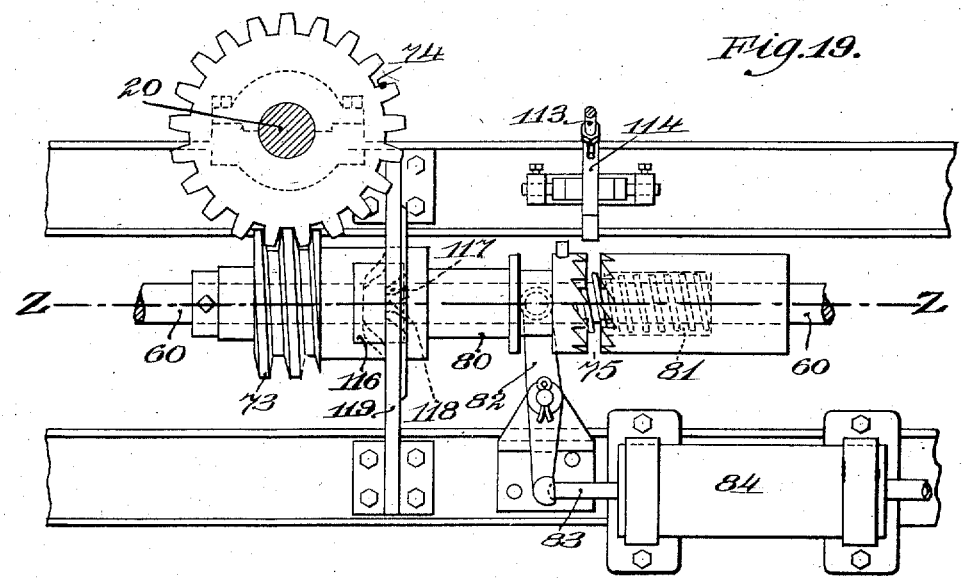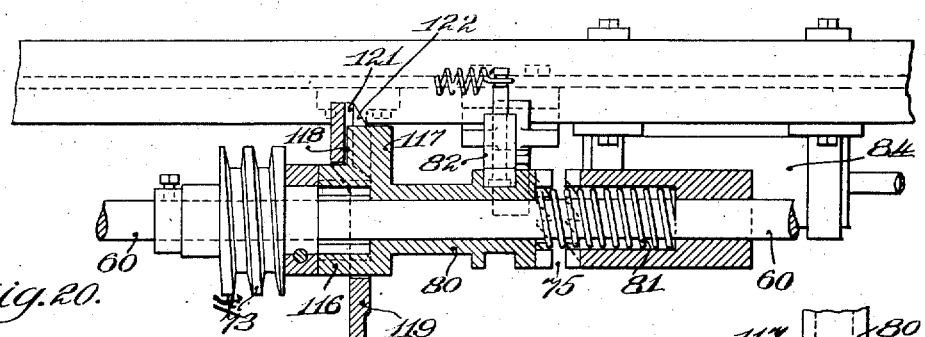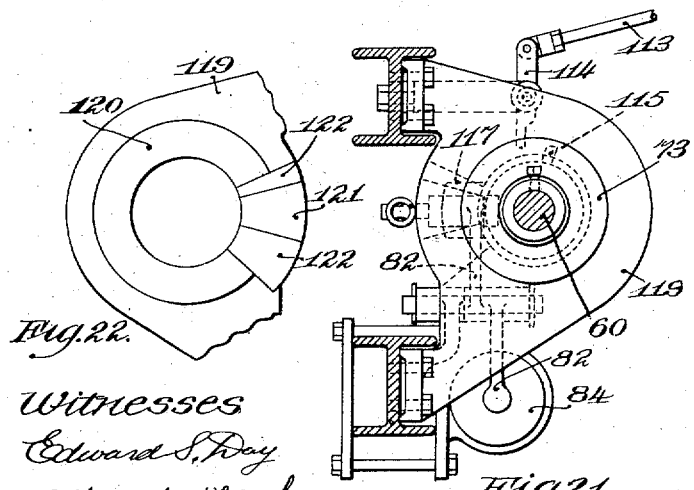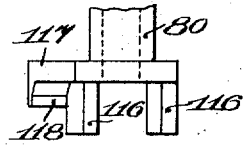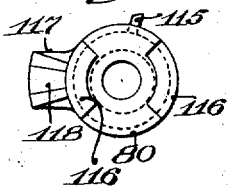

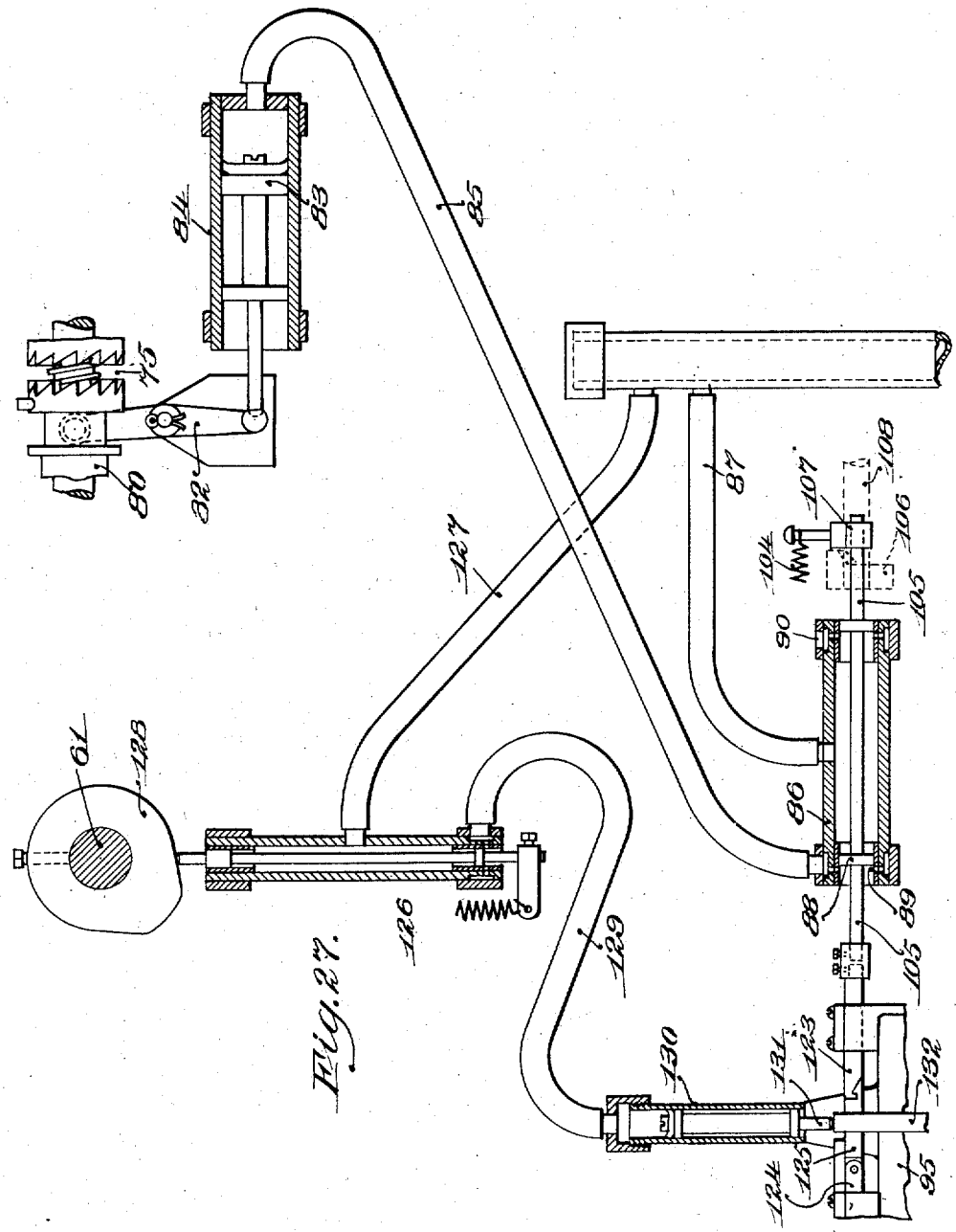

UNITED STATES PATENT OFFICE.

ERASTUS E. WINKLEY, OF LYNN, MASSACHUSETTS.

MACHINE FOR OPERATING UPON BOOTS AND SHOES.

1,030,627.    Specification of Letters Patent.    Patented June 25, 1912.

Application filed February 17, 1906. Serial No. 301,578.

*To all whom it may concern:*

Be it known that I, ERASTUS E. WINKLEY, a citizen of the United States, residing at Lynn, in the county of Essex and State of Massachusetts, have invented certain new and useful Improvements in Machines for Operating upon Boots and Shoes; and I do hereby declare the following to be a full, clear, and exact description of the invention, such as will enable others skilled in the art to which it appertains to make and use the same.

The present invention relates to machines for operating upon boots and shoes in which the shoe and the operating means are relatively movable and rotatable to transfer the point of operation of the operating means around the shoe, such, for instance, as welt and turn shoe sewing machines, outsole stitchers, lasting machines, pegging machines, sole edge trimming and finishing machines, etc.

The principal object of the present invention is to produce a machine of the class referred to by which the shoe is acted upon automatically without any attention on the part of the operator excepting the placing of the shoe upon a jack and the removal of the shoe from the jack after it has been operated upon.

Other objects of the present invention are in general to improve the construction and operation of machines for operating upon boots and shoes.

In all practically operative machines heretofore devised for operating upon boots and shoes in which the shoe and the operating means have been relatively moved and rotated to transfer the point of operation of the operating means around the shoe, the shoe is either held in the hand of the operator during the operation of the machine thereon, or is supported upon a freely movable jack, in both instances the shoe being manipulated by the operator to properly present the different portions thereof to the operating tool or tools of the machine. The movements imparted to the shoe by the operator in order to present the different portions thereof to the action of the tool or tools of the machine consist of lateral and longitudinal tipping movements to bring the portion of the sole in proximity to the tool into the desired plane, and lateral turning movements to bring the edge of the sole into a position parallel with the line of feed.

Machines of the class to which the present invention relates have heretofore been devised in which the shoe was supported upon an automatically actuated jack, but these machines have not been practically operative because they have contained no provision for the proper manipulation of the shoe.

The present invention contemplates the provision in a machine for operating upon boots and shoes of a jack for supporting the shoe and means for relatively actuating the jack and the portion of the machine frame in which the operating tool or tools are mounted, to bring the shoe into the proper position with relation to the tool or tools as the point of operation of the tool or tools is transferred around the shoe. The relative movements of the shoe supporting jack and the portion of the machine frame which supports the tool or tools may be produced by moving either the frame of the machine or the jack, and consist either of tipping movements to maintain the portion of the sole in proximity to the tool or tools in the proper plane with relation to the tool or tools, or of lateral turning movements to maintain the edge of the sole parallel to the line of feed or of both tipping and lateral turning movements. In a machine in which the shoe is manipulated by the operator the tipping movements and lateral turning movements which are imparted to the shoe take place about the point of operation of the tool or tools as a center, and thus the movements imparted to the shoe do not displace the shoe with relation to the tools. In accordance with a feature of the present invention the relative tipping movements which are imparted to the jack and the portion of the frame which supports the tool or tools take place about a center substantially coincident with the point of operation of the tool so that the machine in its operation approximates very closely the operation of a machine in which the shoe is manipulated by hand, no substantial displacement of the shoe with relation to the tools being produced by the relative movements, and the work being performed in as satisfactory a manner as when the shoe is manipulated by hand, and the results produced being more uniform.

In addition to the features of invention above referred to, the present invention also consists in certain devices, combinations and arrangements of parts hereinafter described, the advantages of which will be obvious to those skilled in the art.

The present invention may be embodied in any machine for operating upon boots and shoes in which the shoe is supported upon a jack and the point of operation of the tool or tools is transferred around the shoe. In the best form of the invention which has as yet been devised, however, it is embodied, as illustrated in the accompanying drawings, in a shoe sewing machine adapted for sewing together the upper and insole of a turn shoe, or the upper, insole and welt of a welted shoe.

Figures 25, 26:
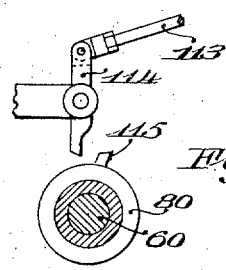
Figure 5:
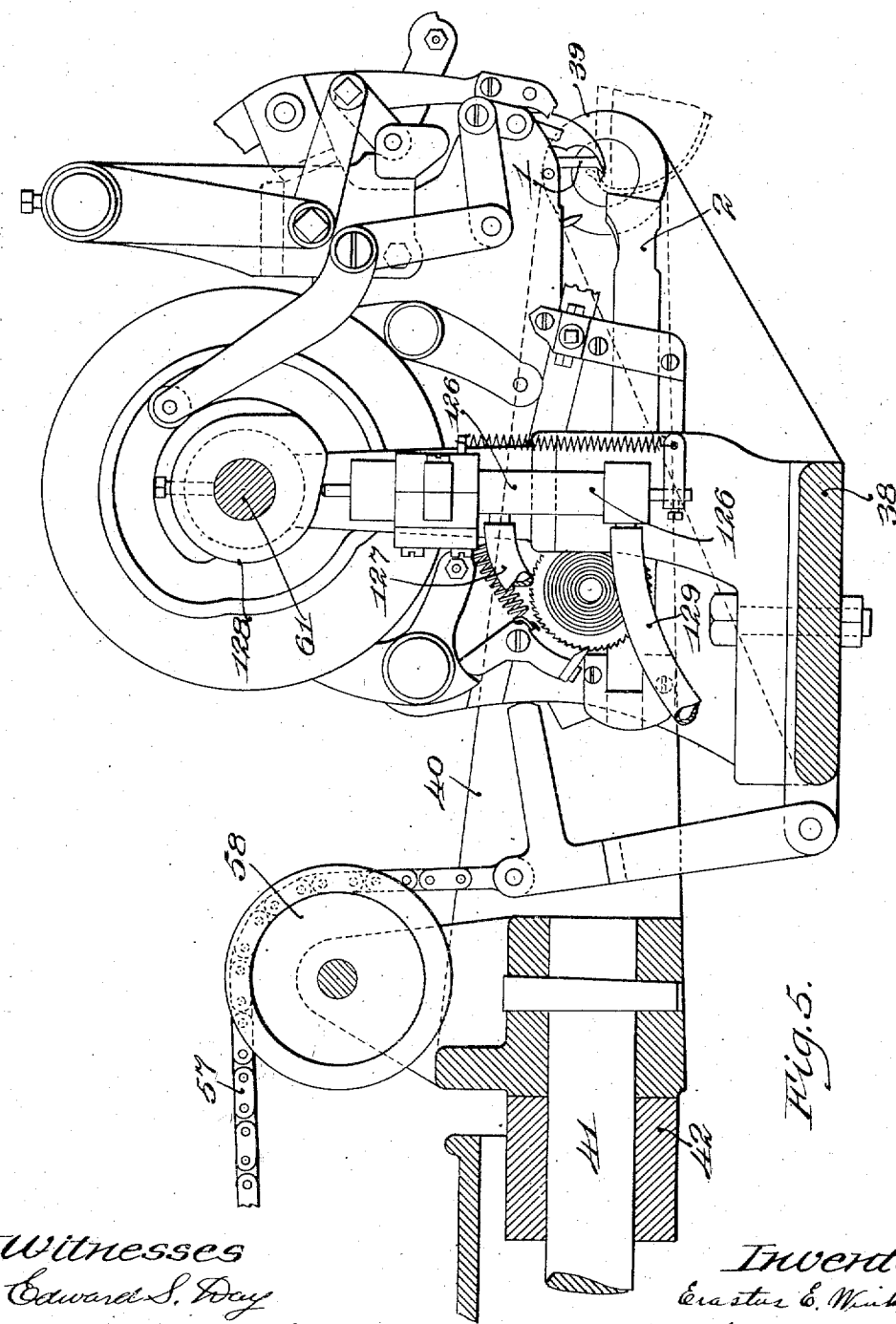
Figure 6:
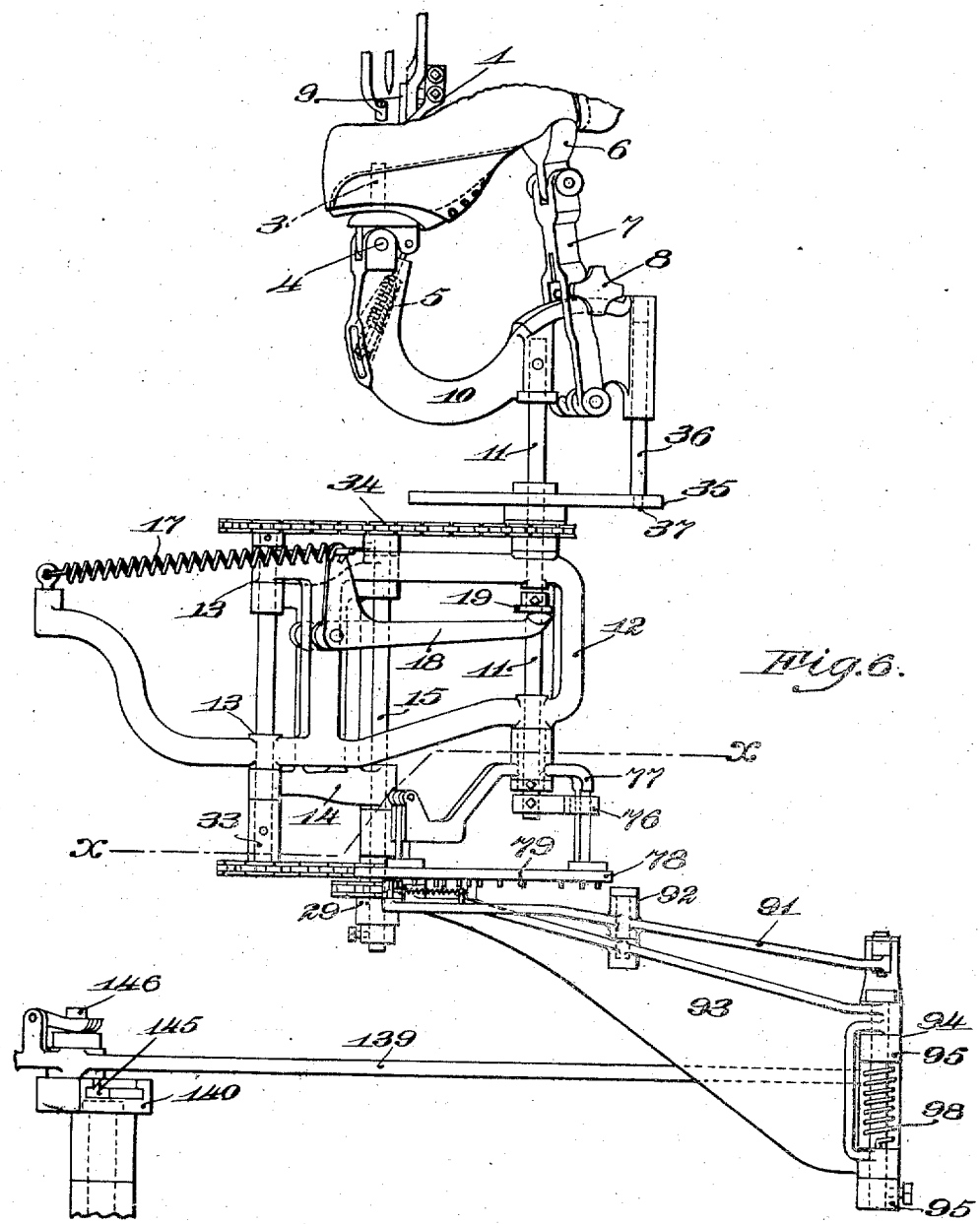
Figure 7:
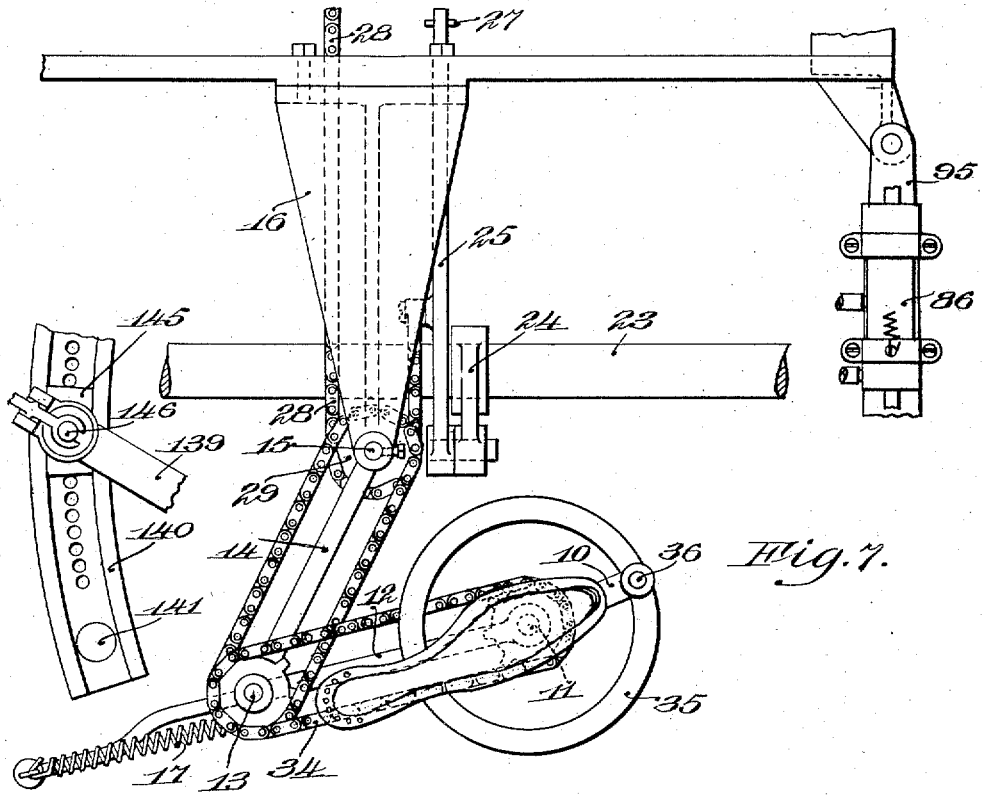
Figure 8:
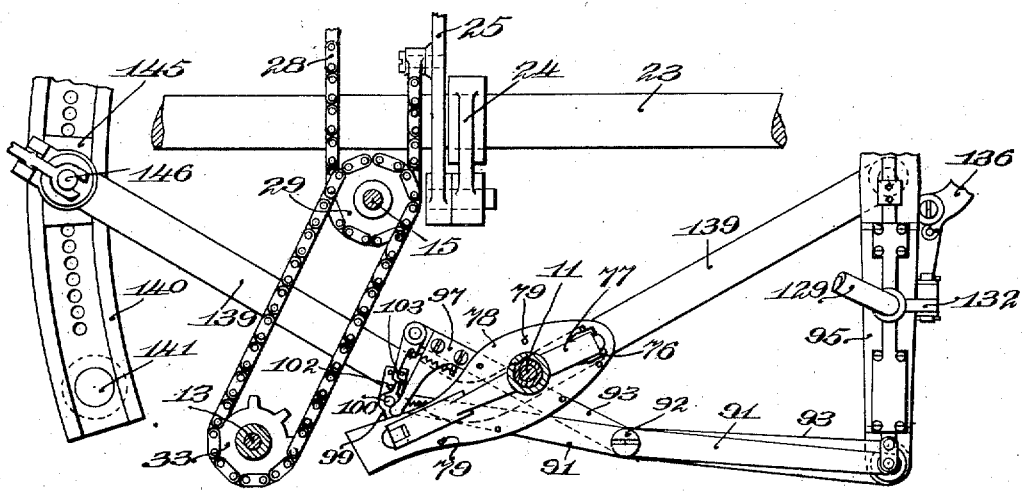
Figure 9:
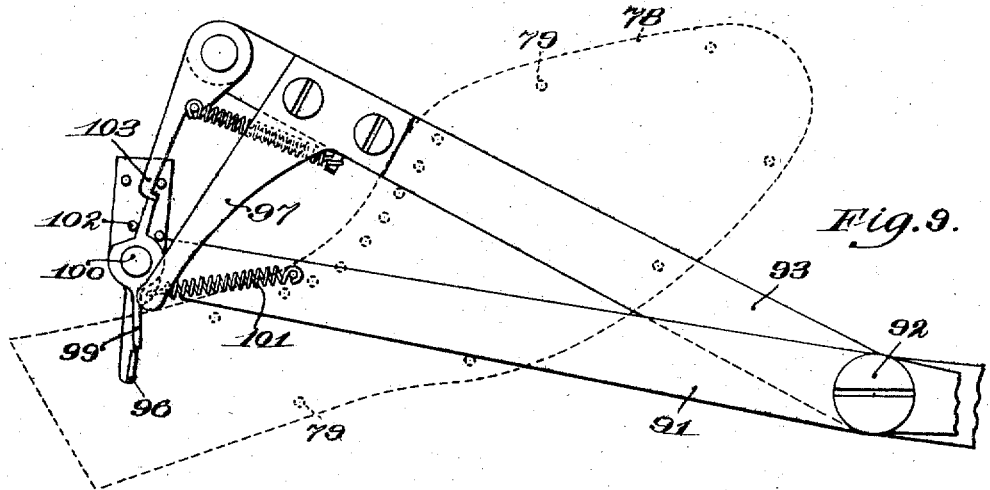
Figure 10:
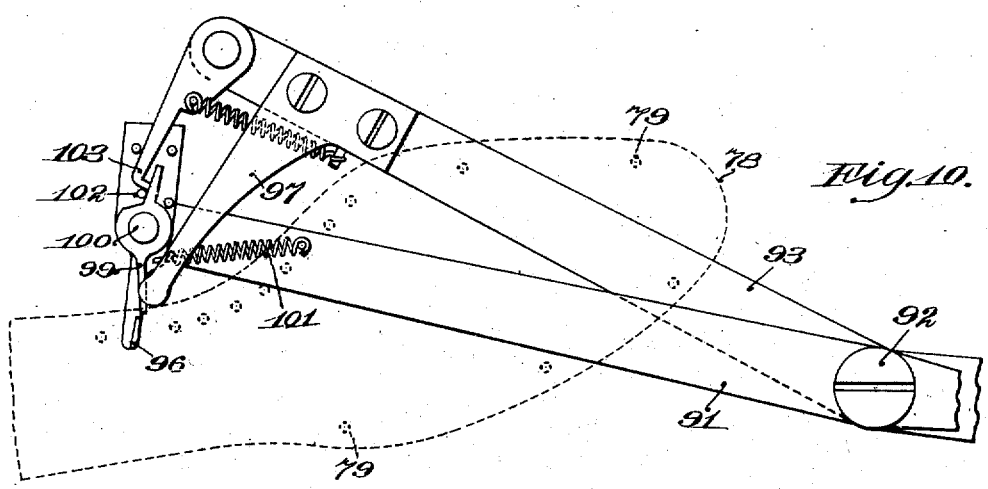
Figure 11:
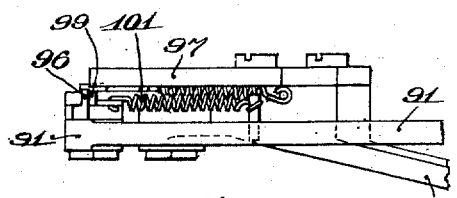
Figure 12:
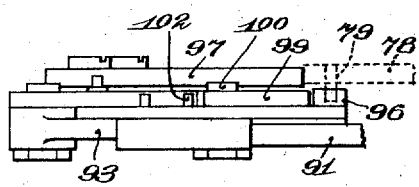
Figure 17:
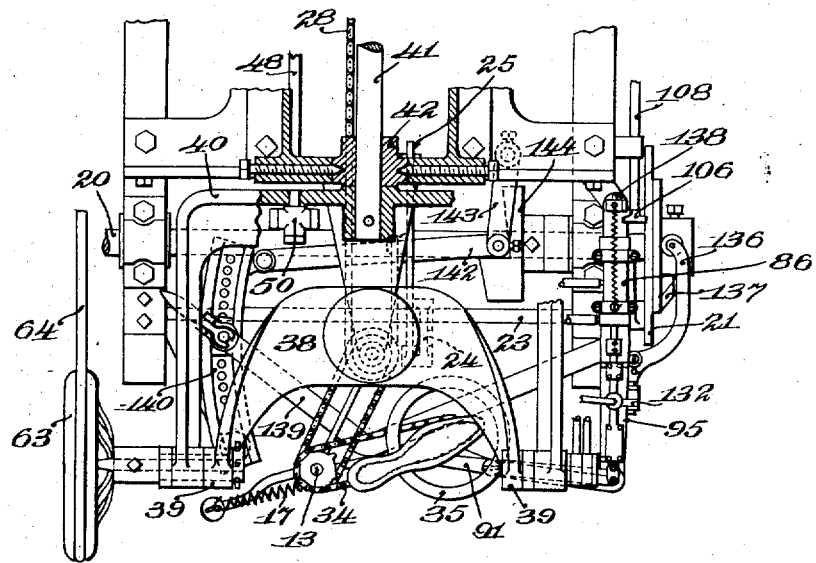
Figure 18:
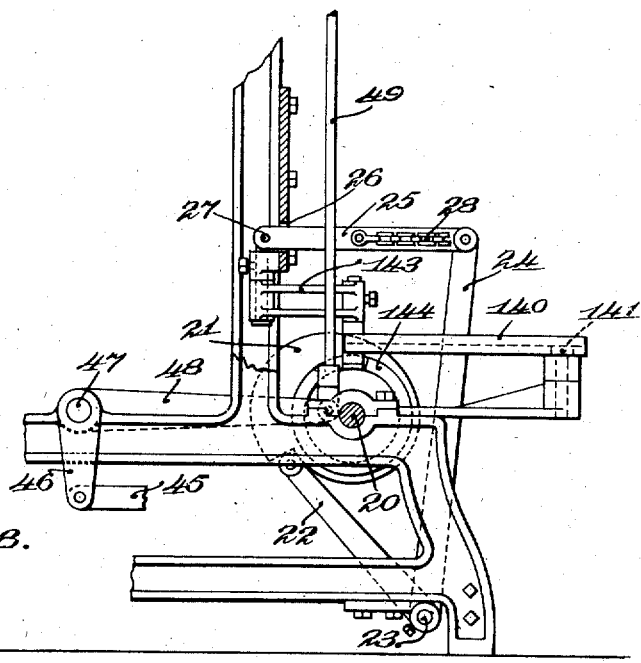

*Drawings.*—Figures 1, 2, 3, and 4 are respectively front, right-hand and left-hand elevations and a plan view of a complete automatic shoe machine embodying the present invention. Fig. 5 is a side elevation showing on a large scale the sewing mechanism and the manner in which it is supported. Figs. 6 and 7 are respectively a front elevation and a plan of the jack with a lasted shoe thereon, the jack supporting mechanism, and parts of the mechanism connected therewith, and Fig. 8 is a plan view of the same parts taken below the line $x$—$x$ in Fig. 6. Figs. 9 and 10 are plan views of a part of the connections between the controller and the correcting mechanism, shown in two positions; Fig. 11 is a front view of the same part, and Fig. 12 is a side elevation looking from left to right in Fig. 10. Fig. 13 is a right hand elevation of part of the machine showing the main air valve and part of its operating mechanism, and Fig. 14 is a plan view and Fig. 15 a section, on line $y$—$y$, Fig. 13, of the same parts. Fig. 16 is a detail view of parts shown in Fig. 13, in different position. Fig. 17 is a plan view of a part of the machine showing particularly the mechanism by which adjustment for sizes is made. Fig. 18 is a left-hand elevation of a part of the machine showing particularly the cams by which adjustment for size and correction for the outline of the shoe sole or bottom of the last are made. Fig. 19 is a right-hand elevation of the clutch mechanism by which the cam shaft is actuated, Fig. 20 is a horizontal section on line $z$—$z$, Fig. 19, and Fig. 21 is a front elevation of the same. Fig. 22 is a detail view in rear elevation of the fixed member of the stop mechanism by which the cam shaft is stopped, and Figs. 23 and 24 are a plan and rear end view of the coöperating moving member. Figs. 25 and 26 are detail front elevations of a tripping mechanism connected with the main valve closing mechanism. Fig. 27 is a diagram of the pneumatic devices.

*General description.*—The machine illustrated in the drawings as embodying the various features of the present invention, comprises sewing mechanism, a jack adapted to hold ordinary wooden lasts upon which welt and turn shoes are lasted, feeding mechanism for feeding the shoe after each stitch, and automatic mechanism for changing the relative position of the sewing instrumentalities and the shoe as the shoe is sewn. Since the function of this automatic mechanism is to correct such relative position, which tends continually to become incorrect as the shoe is fed, owing to the irregular form of the shoe, this mechanism is for convenience hereinafter termed, "correcting mechanism," and this term as used in the claims except where specifically qualified, is to be understood as including any mechanism, apart from the feeding mechanism of the machine in which the invention is embodied by which the relative position of the sewing instrumentalities or other operating means and the shoe are changed during the operation of the machine to cause the shoe to be presented properly to the operating means. The term "correcting movements" signifies similarly the relative movements of the operating means and the shoe caused by the correcting mechanism.

*Sewing mechanism.*—The sewing mechanism shown in the drawings is the same as that of the well known Goodyear welt and turn shoe sewing machine disclosed in Patent No. 412,704, Oct. 8, 1889, reference to which may be had for a complete disclosure of the construction and operation of this mechanism. It comprises among the other usual instrumentalities a channel guide 1 and a back gage 2 for guiding the work.

*The jack.*—The jack (Fig. 6) is adapted to hold lasts of various sizes, having the usual last pin 3, pivoted at 4 and drawn forward by a spring 5, and a toe support 6 mounted on a pivoted arm 7 adjustable for shoes of different lengths and held in position by a clamping screw 8.

*Feeding mechanism.*—The shoe is fed by a feed point 9 of the usual form, forming a part of the sewing machine and engaging the bottom of the channel in which the seam is laid. The feeding mechanism thus acts directly upon the shoe and the provision in an automatic shoe machine of a feeding mechanism which acts in this manner as distinguished from a feeding mechanism which acts upon the jack is considered to constitute a valuable feature of the present invention since it obviates all irregularities in feeding which might result from lost motion in the jack supporting mechanism or from irregularities in the forms of the shoes, and generally simplifies and improves the mechanism of the machine.

To permit the shoe to be freely fed by the feed point 9 the jack is mounted on a freely movable support. The frame 10 of the jack is fixed to a vertical spindle 11 sliding and turning in the end of an arm 12 pivoted at 13 to the end of an arm 14 pivoted at 15 (Figs. 2, 3 and 7) to a bracket 16 forming part of the frame of the machine. This construction permits the jack to be moved freely in any horizontal direction. A spring 17 (Fig. 6) connected to a lever 18 bearing against a collar 19 on the spindle 11 presses the last and jack upward to keep the shoe in contact with the channel guide. The back gage 2 operates precisely as in the usual sewing machine.

Figure 3:
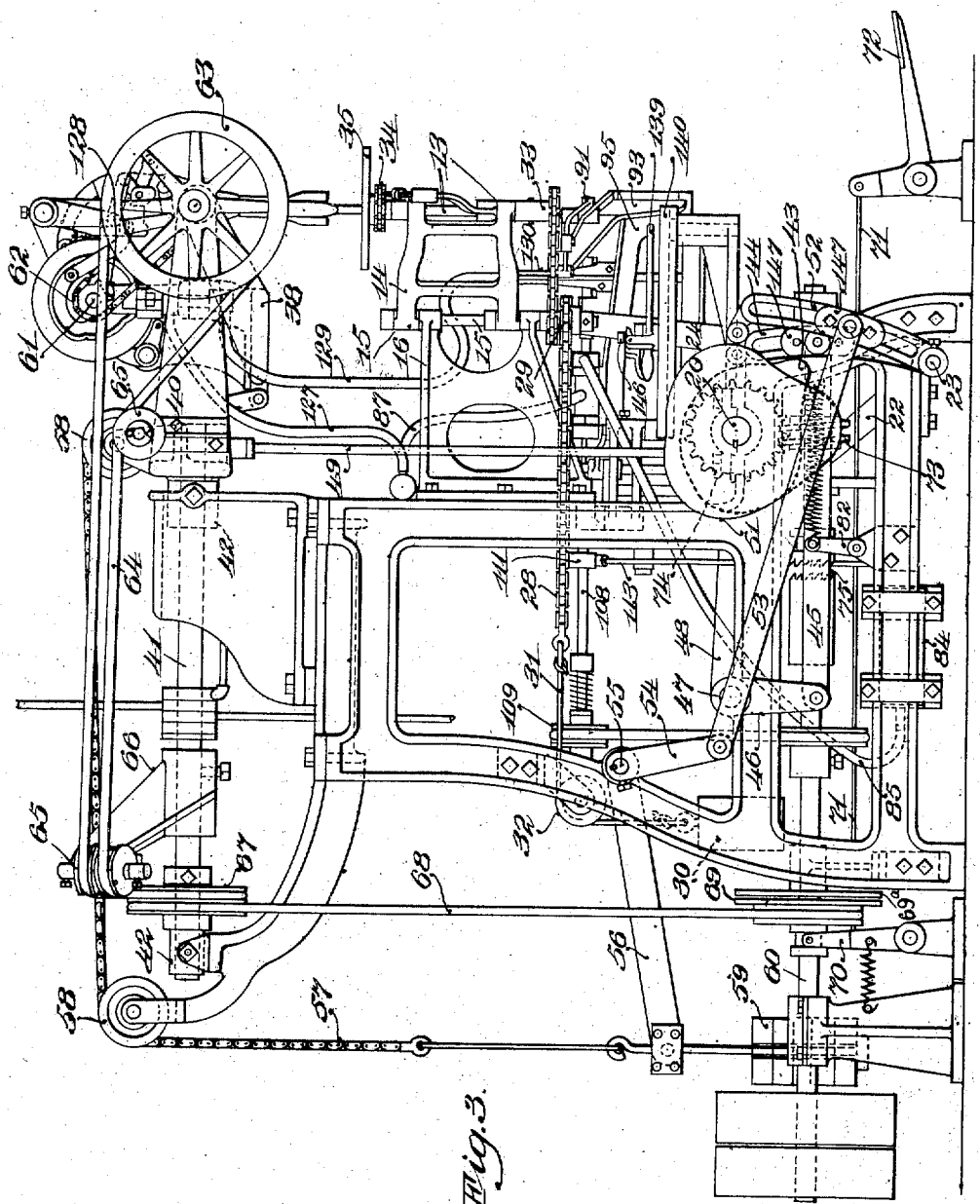
Figure 4:
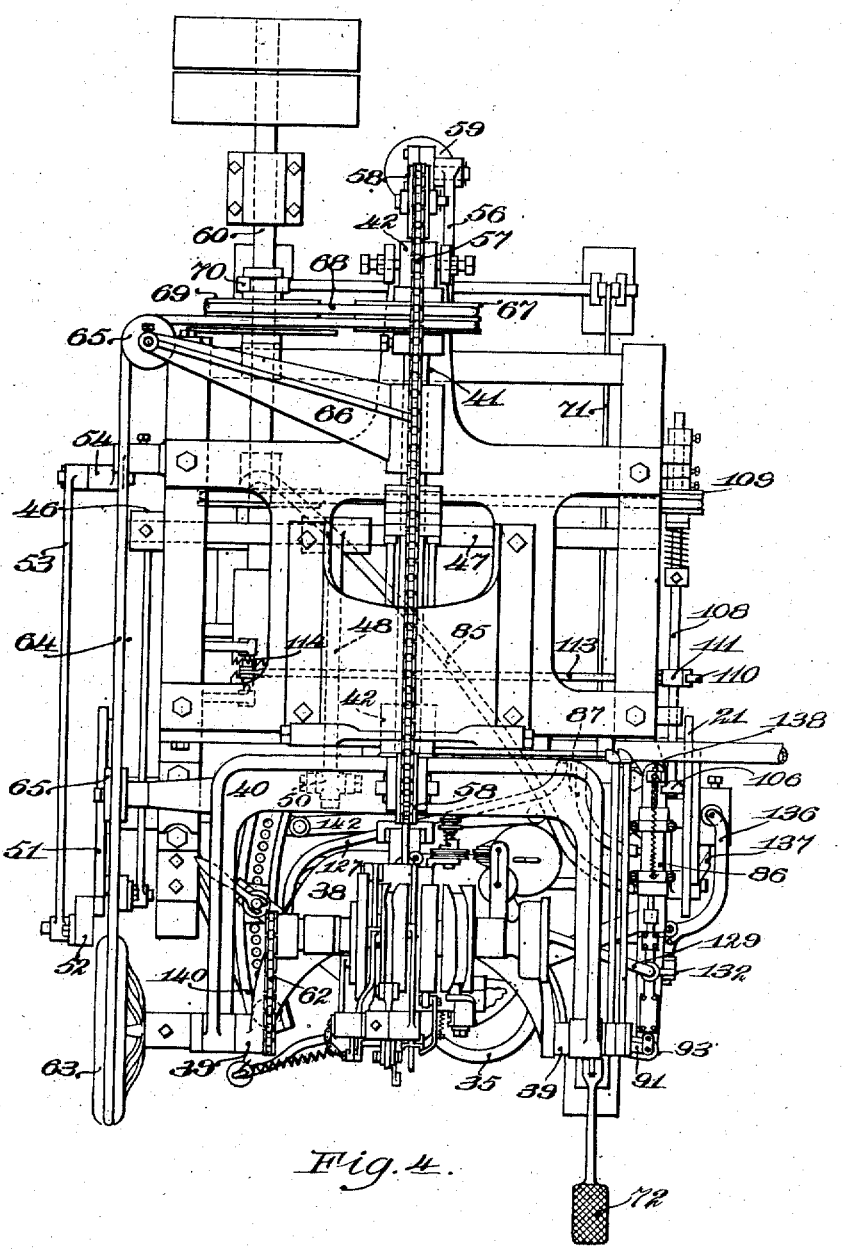

*Correcting mechanism.*—The relative correcting movements imparted to the shoe and the sewing instrumentalities are three: 1st, the turning movements by which the edge of the shoe sole in proximity to the needle is kept substantially parallel to the line of feed, whatever the outline of the shoe; 2nd, the tipping movements by which correction is made for the longitudinal curvation or "spring" of the shoe sole, nd 3rd, the tipping movements by which correction is made for the lateral curvature of the sole. In the machine illustrated in the drawings correcting movements are imparted to both the sewing machine and the jack, all of the tipping movements being imparted to the sewing machine and turning movements only being imparted to the jack. This arrangement in which some of the correcting movements are imparted to the instrumentalities which operate upon the shoe also constitutes a valuable feature of the present invention since it results in a simple and light jack-supporting mechanism which easily permits the feeding of the shoe in the manner described, and also results generally in simplification and improvement in the mechanism of the machine. The several correcting movements are caused by cams on a transverse cam shaft 20 (Figs. 1, 2, and 3).

*Turning movement.*—The turning movement is caused by a cam 21 (Figs. 1, 2, 4, 17 and 18) engaged by a cam lever 22 fixed to a rock shaft 23. An arm 24 fixed to the rock shaft is connected at its upper end with a link 25 (Figs. 2 and 18) sliding freely at its rear end in a hole in the frame of the machine, the outward movement being limited by a stop pin 27 on the link. A sprocket chain 28 (Figs. 3, 7, 8 and 18) is connected at one end to the link 25, passes around a double sprocket 29 journaled on the shaft 15 by which the arm 14 is pivoted to the bracket 16, and is connected at its other end to a weight 30 by means of a cord 31 passing over a pulley 32 (Figs. 1, 2, and 3). The sprocket 29 is connected by a sprocket chain with a sprocket 33 (Figs. 6, 7, and 8) fixed to the shaft 13 on which the arm 12 is pivoted, and the upper end of the shaft is connected by sprockets and a chain 34 with a wheel 35 loosely journaled on the stem 11 and connected with the frame 10 of the jack by a pin 36 mounted in the wheel and having a sliding engagement with the frame of the jack.

The chain and sprocket connections above described are such that movement of the jack in a horizontal direction does not turn the jack relatively to the sewing instrumentalities, but rotation of the cam 21 causes such turning movement, the cam lever 22 being held constantly in engagement therewith by the weight 30 so that the jack may be turned in either direction by the cam. The pin 36 permits the jack to rise and fall independently of the wheel 35, and the pin 36 may be disengaged from the hole 37 in which its lower end rests, to permit the jack to be freely turned by the operator, when desirable.

*Tipping movements.*—The tipping movements are imparted to the sewing instrumentalities. The entire sewing mechanism is carried (Figs. 1, 2, 3, 5, and 17) on a yoke 38 pivoted at its ends 39 in a forked carrier 40 mounted on a horizontal rock shaft 41 journaled in bearing blocks 42 on the frame of the machine. By this construction the sewing mechanism may be tilted in two directions about axes substantially in the general plane of the sole of the shoe on the jack, so that corrections may be made for both the spring and the lateral curvature of the sole; and since these axes pass substantially through the extremity of the channel guide 1, as shown particularly in Fig. 5 the tipping movements do not cause any substantial movement of translation in the operating extremities of the sewing instrumentalities.

The tipping movements which are imparted to the sewing mechanism not only maintain the stitch forming devices in the required position with relation to the shoe, but also maintain the feeding mechanism with relation to the shoe so that it acts always in a direction substantially parallel to the surface of the shoe sole. The action of the feeding mechanism is thus uniform and does not vary at the different portions of the shoe except as an adjustment of the feeding mechanism is made by the operator. This action of the feeding mechanism is of value, and the provision in an automatic shoe machine of a feeding mechanism which acts always in a direction substantially parallel to the surface of the sole of the shoe is considered to constitute a feature of the present invention which, broadly considered, is not limited to a construction in which the feeding mechanism acts directly on the shoe, and which may be embodied in any automatic shoe machine provided with means for operating upon a shoe; a shoe supporting jack and means acting automatically to present successive portions of the shoe to the operating means.

The tipping movements about the rock shaft 41 are caused by a cam 43 (Figs. 1 and 3) on the cam shaft 20 engaging a cam lever 44 pivoted on the rock shaft 23 and connected by a link 45 with an arm 46 fixed to a rock shaft 47 carrying an arm 48 connected at its forward end by a universal joint with a link 49. The link 49 is connected by a universal joint 50 (Fig. 17) with the carrier 40. The parts supported on the rock shaft 41 are somewhat over-balanced on the left-hand side, so that the cam lever 44 is held in contact with its cam and the carrier may be tilted in either direction by the cam.

The tipping movements about the pivoted axis of the yoke 38 are caused by a cam 51 on the cam shaft 20 (Figs. 1, 3 and 4) engaged by a cam lever 52 pivoted on the rock shaft 23 and connected by a link 53 with an arm 54 on a rock shaft 55. An arm 56 on the rock shaft is connected by a chain 57 passing over guide pulleys 58 with the yoke 38 on which the sewing mechanism is mounted. A counterpoise 59 suspended from the arm 56 partly balances the weights of the yoke and sewing mechanism.

*Actuating mechanism.*—The sewing mechanism and the correcting mechanism are actuated by connections with a power shaft 60 (Figs. 1, 2, 3 and 4), driven constantly by suitable power connections. The cam shaft 61 of the sewing machine is driven from a pulley 63 journaled concentrically with the pivotal supports 39 of the yoke 38 through a sprocket chain 62 passing over sprocket wheels secured to the cam and pulley shafts. A belt 64 passing over guide pulleys 65 journaled on arms 66 fixed on the rock shaft 41 connects the pulley with a double pulley 67 journaled on the shaft 41. The pulley 67 is connected by a belt 68 with a clutch member 69 mounted loosely on the power shaft 60 and connected by a forked arm 70 and a link 71 with a treadle 72 at the front of the machine. By means of the treadle 72 and connections referred to the clutch member 69 can be moved into engagement with a coöperating clutch member 69ª fast on the shaft 60. Thus the sewing mechanism may be started and stopped at will by the treadle 72, and the power connections above described are so arranged as to be unaffected by the correcting movements imparted to the sewing mechanism.

The cam shaft 20 and the correcting cams thereon are actuated by a worm 73 (Figs. 1, 19, 20, and 21) journaled loosely on the power shaft 60 and engaging a worm 74 on the cam shaft 20. The worm wheel is connected with the power shaft at suitable times by a clutch 75.

*Controlling mechanism.*—The correcting mechanism of the present invention does not operate constantly, nor does its operation have any fixed relation to the operations of the sewing mechanism. It operates under the control of a mechanism by which the correcting movements are directly correlated in point of time with the progress of the sewing operation; that is the several correcting movements do not occur at intervals measured by the performance of definite numbers of cycles of operation by the sewing or other operating means, but occur when certain points on the shoe are reached in the course of the operation thereon. This mode of operation is a valuable feature of the present invention, for it not only makes practical the feeding of the shoe by a feeding mechanism acting directly thereupon, as above described, but it is an essential feature of the arrangement by which, in the illustrated embodiment of the invention, the machine is adjusted to operate on shoes of different sizes. It will be noted that if the correcting movements were timed to occur after definite numbers of stitches had been formed by the sewing mechanism any variations in the length of the stitches or in the distances between corresponding parts of the shoes would disturb the relation between the correcting mechanism and the feeding mechanism, and the correcting movements would not occur at the right moments. In the present arrangement, however, the length of the stitches is immaterial, and the operator may, in fact, change at will the adjustment of the feed mechanism by which the length of feed is determined without any other adjustment in the machine.

The spindle 11 on which the jack is mounted is prolonged below the arm 12 (Figs. 1, 6, 7 and 8) and provided with a fixed arm 76 having a forked end engaging a vertical portion of a frame 77 loosely journaled concentrically with the spindle 11, on a sleeve projecting from the arm 12. A controller 78 is secured to the frame 77 and is in the form of a plate having the general form of a shoe sole and provided with a series of downwardly projecting pins 79 acting as trips to intermittently set the correcting mechanism into operation.

The connections between the controller 78 and the clutch 75 are, for convenience of construction and operation, made partly pneumatic, the clutch 75 being operated by a pneumatic cylinder supplied with air through a valve intermittently opened by the trips 79. The free member 80 of the clutch 75 (Figs. 19, 20, 21 and 27) is held normally out of engagement with the rotating member by a spring 81, but is connected by a forked lever 82 with the piston 83 of an air cylinder 84 connected by a pipe 85 with the main air valve casing 86, which is connected by a pipe 87 with a suitable source of compressed air. The air valve 88, when in its normal position shown in Fig. 27 affords an exhaust passage from the cylinder 84 by uncovering exhaust vents 89 in the valve casing 86, and it simultaneously exhausts the compressed air into the atmosphere through ports 90. When the air valve is moved to the left of the position of Fig. 27 it closes the ports 90 and connects the pipe 85 with the interior of the valve casing, admitting compressed air to the cylinder 84 to throw the clutch 75 into operation and actuate the cam shaft 20 and the correcting mechanism.

The valve 88 is connected (Figs. 6, 7, 8, 9, 10, 13 and 14) with a valve lever 91 pivoted at 92 on a supporting arm 93 pivoted at 94 on arm 95 which, for a purpose to be described later is also pivotally mounted. The supporting arm 93 has a lateral extension 97 which rests against the edge of the controller, the arm 93 being, to this end, provided with a spring 98 (Fig. 6) to swing it outward. By this arrangement the valve lever 91 is normally held in such position that the trips 79 will engage a latch 99 (Fig. 9) pivoted at 100 on the valve lever and held normally in the position of Fig. 9 by a spring 101 and a stop pin 102. In this position the latch 99 engages a detent 103 pivoted on the arm 93, and thus the valve lever is held in such position as to prevent the opening of the air valve by a spring 104 (Figs. 13, 14, and 27) connected with the air valve stem 105. Upon the engagement of the latch by one of the trips, however, the latch is swung so as to disengage the detent 103, and the valve lever is free to swing to the position of Fig. 10 under the action of spring 104, allowing the spring 104 to open the air valve; whereupon the air piston 83 throws the clutch 75 into engagement and the cam shaft 20 is set in motion. When the valve lever 91 swings to the position indicated in Fig. 10 an upward extension 96 on the lever 91 is moved into the paths of the trips 79 and thus the passage of a trip past the latch 99 is prevented until the valve lever 91 is returned to the position indicated in Fig. 9 and a single actuation of the air valve by each trip is insured. Shortly after the clutch is thus thrown into operation and before it has completed a revolution the air valve is closed again and the trip mechanism reset by a cam 106 engaging a lug 107 on the valve stem 105. The cam 106 is fixed to a shaft 108 (Figs. 2, 13, 14 and 26) journaled on the frame of the machine, and provided with a slip-pulley 109 connected by a belt with a pulley on the power shaft 60 (Fig. 2). The slip-pulley 109 tends to rotate the shaft 108 constantly, but the shaft is normally held stationary, with the inoperative part of the cam 106 opposite the lug 107, by a stop 110 (Figs. 2 and 26) pivoted on the frame and normally engaging a lug 111 on the shaft 108 under the influence of a spring 112. The stop 110 is connected by a link 113 with a trip lever 114, (Figs. 21 and 25) which is pivoted on the machine frame in position to be engaged by a trip 115, carried by the clutch member 80, shortly after the clutch member commences to rotate, and by these means the shaft 108 is released and permitted to rotate once and reset the valve mechanism, being then stopped again by the stop 110.

The clutch 75 is constructed to make one rotation and then stop at each operation of the valve as above described. The clutch member 80 drives the worm 73 by the engagement therewith of horns 116 (Figs. 19, 20, 21, 22, 23, and 24) which permit the clutch member to move longitudinally without disconnection from the worm, and the clutch member 80 is provided also with a stop arm 117 having a central part 118 with straight sides, (Figs. 23 and 24). A cooperating plate 119 fixed to the frame of the machine is provided with an annular bearing surface 120 and a depression having a straight-sided central recess 121 and lateral inclined surfaces 122. Normally the stop arm 117 rests in the depression in the plate 119 the part 118 engaging the recess 121 and locking the clutch member 80 and the worm 73 against accidental rotation. When the pneumatic mechanism operates to move the clutch member 80 to the right such movement disengages the part 118 of the stop arm from the recess 121 and simultaneously engages the teeth on the two clutch members, and the consequent rotation of the member 80 causes the stop arm 117 to ride up the incline 122 on the disk 119 and insure the full engagement of the clutch teeth. After the air valve has closed the engagement of the clutch members is maintained, during a rotation, by the stop arm bearing against the surface 120 until the stop arm again reaches the depression, when it is forced into the depression by the spring 81 and the clutch is disengaged, the portion 118 of the stop arm engaging the recess 121 and insuring the stopping of the member 80 and the worm.

In sewing around the toe of a narrow-toed shoe it is necessary to turn the shoe constantly to maintain the proper relative position of the shoe and the sewing mechanism. To accomplish this a supplementary valve-operating mechanism is preferably provided, which acts independently of the controller 79. (Figs. 13, 14, 15, 16 and 27). The valve stem 105 is connected with the valve lever 91 by slides 123 and 124 having bearings on the frame arm 95. The slide 123 has a hooked extremity normally engaged by a pivoted hook 125 on the slide 124, which is pressed upward by a spring plunger 156 (Fig. 15). A supplementary air valve 126 (Figs. 5 and 27) connected by a pipe 127 with the compressed air supply is opened at each rotation of the shaft 61 of the sewing mechanism by a cam 128 fixed to the shaft 61, and admits air through a flexible tube 129 to a cylinder 130 on the arm 95, in which is a piston 131. The piston is normally held in raised position by a detent lever 132 having a sliding pivotal connection at 133 with the frame arm 95 (Fig. 15) and resting at its upper end on a lug 134 against which it is maintained by a spring plunger 135 engaging its lower end. A trip lever 136 pivoted on the arm 95 engages the detent lever 132 and carries a cam roll engaging a cam 137 (Figs. 1, 2 and 14) on the cam shaft 20. The cam 137 has a rise so located that when the toe of the shoe is reached in the course of the sewing operation the rise is brought by the rotation of the cam shaft, into engagement with the roll on the trip lever 136, which thereupon trips the detent lever 132 from the lug 134 and permits the air piston 131 to depress the detent lever and the hook 125 to the position of Fig. 16. The main valve 88, when so released, is immediately opened by the spring 104, and the clutch 75 is thrown into operation, and since the auxiliary air valve 126 is reopened at each stitch the cam shaft clutch 75 remains in substantially continuous operation until the toe has been traversed and the cam 137 has turned sufficiently to allow the trip lever 136 to return to normal position and release the trip lever 132 and restore the connection between the main air valve and the controller.

*Adjustment for sizes.*—A valuable feature of the present invention consists in the arrangement by which a simple adjustment enables the machine to operate on shoes of different sizes. In shoes of different sizes but of the same style or form of last the several curves in the outline and the surface of the sole are substantially the same in character, and the proportions are substantially the same throughout. Therefore in operating on shoes of different sizes correcting movements of the same character and amplitude may be used, it being necessary however, to vary the times at which such movements occur according to the length of the shoe. In order that this may be done in the present machine the valve-operating devices actuated by the trips on the controller are made movable in the direction in which the shoe and the controller are fed, and means are provided for giving them such movement, of amplitude adjustable to vary from zero to a maximum. The result of such movement is to delay proportionately the moment of engagement of each trip with the latch, so that the controller operates precisely as if its length were increased or a controller of greater length were substituted and thus if the controller be made of a size corresponding to that of the smallest shoe to be sewed, it may also be used for shoes of all greater lengths by the use of this mechanism.

The frame arm 95 (Figs. 1, 2, 5, 13 and 17) is pivoted at 138 to the frame of the machine, and is connected by a link 139 with a segmental lever 140 pivoted at 141 to the frame of the machine. The lever 140 is connected by a link 142 with a cam lever 143 (Figs. 17 and 18) engaging a helical cam 144 on the cam shaft 20. As the cam shaft 20 is gradually rotated in the progress of the sewing operation the lever 140 is coincidentally swung gradually to the left. The link 139 is connected to the lever 140 by a block 145 (Figs. 7 and 9) engaging the slotted upper side of the lever 140 and the block 145 may be moved along the lever, and may be fixed in position thereon by a latch pin 146 engaging holes in the lever 140. The position of the block 145 on the lever 140 determines the amplitude of the movement imparted to the frame arm 95 by the mechanism just described, and thus the machine may be adjusted for different sizes of shoes by merely raising the latch pin 146 and swinging the link 139 to a new position.

*Adjustment for style.*—Although when shoes of radically different styles are to be sewed on the machine the cams or the controller, or both must be arranged, certain adjustments are provided by which the machine may be arranged to operate on styles differing only in the amplitude of the correcting movements required. The cam levers 44 and 52 (Fig. 3) by which the tilting movements are imparted to the sewing mechanism are adjustably connected with the links 45 and 53 by sliding blocks 147, and by changing the positions of these blocks the amplitude of the tilting movements caused by the cams may be varied. These adjustments alone are sufficient where two styles of shoes differ substantially only in the extent to which the soles are curved laterally and longitudinally. In other cases it may be sufficient merely to change the controller without changing the cams.

*Operation.*—With the parts of the machine in the position shown in Figs. 1, 2, and 3 the operator draws the jack forward, places a last and shoe upon it, and then depresses the jack and inserts the channel guide in the channel. The operator then depresses the treadle and the sewing mechanism begins to sew and feed the shoe. As the operation progresses the trips on the controller successively set the correcting mechanism into momentary operation to make the necessary corrections until the toe is reached. At this point the auxiliary valve mechanism comes into operation, and as the toe is sewed the jack is swung with a substantially continuous motion. The trips then again come into operation and the sewing is continued until the end of the seam is reached when the operator releases the treadle and the sewing ceases. The shoe is then removed and the operator actuates the valve mechanism one or more times by hand, if necessary, to complete the rotation of the cams and bring them again to their starting points. After all shoes of one size have been sewed the operator adjusts the link 139 and sews the shoes of the next size. If any imperfection occur in the work and it is necessary to do over or "cobble" the imperfect portion the correcting mechanism may be thrown out of operation by shutting off the compressed air or by swinging the valve opening mechanism back out of contact with the controller, and the sliding pin 36 may be raised to release the jack and permit the shoe to be turned back to the right point. The pin 36 will then rest idly on the wheel 35, and when the shoe has again been fed to the point where the seam was interrupted, being turned by hand by the operator in the meantime, the pin will again engage the hole 37 and the normal operation of the machine may be resumed.

Although the invention has been described as embodied in a machine for sewing shoes it will be understood that it is applicable to machines for performing operations of various kinds where the services of a skilled operator are usually necessary to guide the shoe; and the invention is not, in general, limited to the details of construction and operation of the illustrated embodiment but may be embodied in other forms within the terms or the spirit of the claims.

Having now described the above invention, what is claimed is:—

1. An automatic shoe machine, having, in combination, means for operating on a shoe, a support for said operating means and a shoe supporting jack relatively movable and rotatable to transfer the point of operation of said means around the shoe, and mechanism acting automatically to move said support with relation to the jack about the point of operation of the operating means as a center as such point is transferred around the shoe, to correct the relative position of the shoe and the operating means.

2. An automatic shoe machine, having, in combination, means for operating on a shoe, a support for said operating means and a shoe supporting jack relatively movable and rotatable to transfer the point of operation of said means around the shoe, and mechanism acting automatically to tip said support with relation to the jack about the point of operation of the operating means as a center as such point is transferred around the shoe to correct the relative position of the shoe and the operating means.

3. An automatic shoe machine, having, in combination, means for operating on a shoe, a support for said operating means and a shoe supporting jack relatively movable and rotatable to transfer the point of operation of said means around the shoe, and mechanism acting automatically as the point of operation of the operating means is transferred around the shoe to tip the support with relation to the jack about said point as a center, and to turn the jack about said point as a center to correct the relative position of the shoe and the operating means.

4. An automatic shoe machine, having, in combination, means for operating on a shoe, a shoe supporting jack longitudinally movable and rotatable to transfer the point of operation of said means around the shoe, feeding mechanism acting directly upon the shoe, and mechanism acting automatically to change the relative position of the jack and operating means as the point of operation of the operating means is transferred around the shoe, said mechanism coöperating with the feeding mechanism to present the shoe properly to the operating means.

5. An automatic shoe machine, having, in combination, means for operating on a shoe, a shoe supporting jack longitudinally movable and rotatable to transfer the point of operation of said means around the shoe, feeding mechanism acting directly upon the shoe, and means controlled by the movement of the jack for changing the relative position of the operating means and shoe as the point of operation of the operating means is transferred around the shoe.

6. An automatic shoe machine, having, in combination, means for operating on a shoe, a support for said means and a shoe supporting jack relatively movable and rotatable to transfer the point of operation of said means around the shoe, mechanism acting automatically as the point of operation of the operating means is transferred around the shoe to impart relative tipping movements to the support and jack to correct the relative position of the operating means and shoe, and means connected with the jack for controlling the operation of said mechanism.

7. An automatic shoe machine, having, in combination, means for operating on a shoe, a support for said means, a shoe supporting jack longitudinally movable and rotatable to transfer the point of operation of the operating means around the shoe, feeding mechanism, mechanism for relatively moving said support and jack to correct the relative position of the shoe and operating means as the point of operation of the operating means is transferred around the shoe, and means for varying the operation of said mechanism for shoes of different sizes without affecting the feeding mechanism.

8. An automatic shoe machine, having, in combination, means for operating on a shoe, a shoe supporting jack longitudinally movable and rotatable to transfer the point of operation of said means around the shoe, feeding mechanism acting directly upon the shoe, and mechanism acting automatically as the point of operation of the operating means is transferred around the shoe to impart relative tipping movements to the support and jack about said point as a center to correct the relative position of the shoe and the operating means.

9. An automatic shoe machine, having, in combination, means for operating on a shoe, a shoe supporting jack longitudinally movable and rotatable to transfer the point of operation of said means around the shoe, feeding mechanism acting directly upon the shoe, and mechanism acting automatically as the point of operation of the operating means is transferred around the shoe to impart relative turning movements to the support and jack about said point as a center to correct the relative position of the shoe and the operating means.

10. An automatic shoe machine, having, in combination, means for operating on a shoe, a shoe supporting jack longitudinally movable and rotatable to transfer the point of operation of said means around the shoe, feeding mechanism acting directly upon the shoe, and mechanism acting automatically as the point of operation of the operating means is transferred around the shoe to impart relative tipping and turning movements to the support and jack about said point as a center to correct the relative position of the shoe and the operating means.

11. An automatic shoe machine, having, in combination, means for operating on a shoe, a support for said means and a shoe supporting jack relatively movable and rotatable to transfer the point of operation of said means around the shoe, mechanism for relatively moving said support and jack to correct the relative position of the operating means and shoe as the point of operation of the operating means is transferred around the shoe, and means for varying the operation of said mechanism for shoes of different sizes.

12. An automatic shoe machine, having, in combination, means for operating on a shoe, a support for said means, a shoe supporting jack longitudinally movable and rotatable to transfer the point of operation of said means around the shoe, mechanism acting intermittently to relatively move the support and jack to correct the relative position of the operating means and shoe as the point of operation of the operating means is transferred around the shoe, and means for varying the intervals between successive operations of said mechanism to adapt the machine for operation on shoes of different sizes.

13. An automatic shoe machine, having, in combination, means for operating on a shoe, a support for said means, a shoe supporting jack longitudinally movable and rotatable to transfer the point of operation of said means around the shoe, mechanism for relatively moving said support and jack to correct the relative position of the operating means and the shoe as the point of operation of the operating means is transferred around the shoe, and mechanism for controlling the operation of the correcting mechanism having provision for adjustment to vary the operation of the correcting mechanism for shoes of different sizes.

14. An automatic shoe machine, having, in combination, means for operating on a shoe, a support for said means, a shoe supporting jack longitudinally movable and rotatable to transfer the point of operation of said means around the shoe, mechanism acting intermittently to relatively move said support and jack to correct the relative position of the operating means and shoe as the point of operation of the operating means is transferred around the shoe, and mechanism for controlling the operation of the correcting mechanism having provision for adjustment to vary the intervals between successive operations of the correcting mechanism to adapt the machine for operation on shoes of different sizes.

15. An automatic shoe machine, having, in combination, means for operating on a shoe, a support for said operating means, a shoe supporting jack longitudinally movable and rotatable to transfer the point of operation of said means around the shoe, and means for tipping the support as the point of operation of the operating means is transferred around the shoe about two axes intersecting at said point to correct the relative position of the shoe and operating means.

16. An automatic shoe machine, having, in combination, means for operating on a shoe, a support for said operating means, a shoe supporting jack longitudinally movable and rotatable to transfer the point of operation of said means around the shoe, feeding mechanism acting directly upon the shoe and mechanism acting automatically to move said support with relation to the jack about the point of operation of the operating means as a center as such point is transferred around the shoe, to correct the relative position of the shoe and the operating means.

17. An automatic shoe machine, having, in combination, means for operating on a shoe, a support for said operating means and a shoe supporting jack relatively movable and rotatable to transfer the point of operation of said means around the shoe, feeding mechanism acting directly upon the shoe, and mechanism acting automatically as the point of operation of the operating means is transferred around the shoe to tip the support with relation to the jack about said point as a center, and to turn the jack about said point as a center to correct the relative position of the shoe and the operating means.

18. An automatic shoe machine, having, in combination, means for operating on a shoe, a support for said operating means and a shoe supporting jack relatively movable and rotatable to transfer the point of operation of said means around the shoe, and mechanism acting automatically as the point of operation of the operating means is transferred around the shoe to impart relative tipping movements to the support and jack about said point as a center to correct the relative position of the shoe and the operating means.

19. An automatic shoe machine, having, in combination, means for operating on a shoe, a support for said operating means and a shoe supporting jack relatively movable and rotatable to transfer the point of operation of said means around the shoe, mechanism for imparting relative turning movements to the support and jack about the point of operation of the operating means as a center to correct the relative position of the shoe and the operating means, and mechanism for intermittently actuating the turning mechanism as the point of operation of the operating means is transferred around the shoe.

20. An automatic shoe machine, having, in combination, means for operating on a shoe, a support for said operating means and a shoe supporting jack relatively movable and rotatable to transfer the point of operation of said means around the shoe, and mechanism acting automatically as the point of operation of the operating means is transferred around the shoe to impart relative tipping and turning movements to the support and jack about said point as a center to correct the relative position of the shoe and the operating means.

21. An automatic shoe machine, having, in combination, means for operating on a shoe, a jack, mechanism for intermittently correcting the relative position of the operating means and the jack, and controlling mechanism acting to throw the correcting mechanism into operation at varying intervals.

22. An automatic shoe machine, having, in combination, means for operating on a shoe, a jack, mechanism for intermittently correcting the relative position of the operating means and the jack, feed mechanism, and controlling mechanism connected with the jack and acting to throw the correcting mechanism into operation at varying intervals.

23. An automatic shoe machine, having, in combination, means for operating on a shoe, a jack, mechanism for intermittently correcting the relative position of the operating means and the jack, feed mechanism, a controller provided with a series of trips acting successively as the shoe is fed to throw the correcting mechanism into operation, and connections between the controller and the correcting mechanism.

24. An automatic shoe machine, having, in combination, means for operating on a shoe, a jack, mechanism for intermittently correcting the relative position of the operating means and the jack, feed mechanism, a controller provided with a series of trips acting successively as the shoe is fed to throw the correcting mechanism into operation, connections between the controller and the correcting mechanism, and adjustable means for moving said connections during the operation of the machine to vary proportionately the intervals between the engagements of the trips therewith in accordance with variations in the sizes of the shoes operated upon.

25. An automatic shoe machine, having, in combination, means for operating on a shoe, a jack, and mechanism for correcting the relative position of the operating means and the shoe as the work progresses comprising cams for imparting such corrective movements, and means for actuating the cams at intervals varying with the variations in the form of the shoe operated upon.

26. An automatic shoe machine, having, in combination, means for operating on a shoe, a jack, mechanism for correcting the position of the jack with respect to the operating means, and a support for the jack freely movable to permit the shoe, during the correcting movements of the jack, to swing about its point of contact with the operating means.

27. An automatic shoe machine, having, in combination, means for operating on a shoe sole, a jack, a jack support on which the jack is mounted to turn about an axis substantially perpendicular to the sole of the shoe on the jack, and correcting mechanism for turning the jack upon its support during the operation on the shoe, in conformity with the outline of the sole, the jack support being laterally movable to permit the shoe, during such turning movement, to swing about its point of contact with the operating means as a center.

28. An automatic shoe machine, having, in combination, means for operating on a shoe sole, a jack, and correcting mechanism for turning the jack during the operation on the sole in conformity with the outline of the sole, the correcting mechanism acting intermittently while the shank and ball of the shoe are operated upon, and acting continuously while the toe is operated upon.

29. An automatic shoe sewing machine, having, in combination, shoe sewing mechanism, including a feeding device acting directly on the shoe, a shoe supporting jack, and mechanism acting automatically in coöperation with the feed to relatively move the shoe sewing mechanism and jack to properly present the shoe to the shoe sewing mechanism.

30. An automatic shoe sewing machine, having, in combination, shoe sewing mechanism, a shoe supporting jack, feeding mechanism and mechanism acting automatically to impart relative tipping movements to the sewing mechanism and jack as the shoe is sewn, said mechanism coöperating with the feeding mechanism to properly present the shoe to the shoe sewing mechanism.

31. An automatic shoe sewing machine, having, in combination, shoe sewing mechanism, a shoe supporting jack and mechanism acting automatically while the shoe is being sewn to impart relative tipping movements to the shoe sewing mechanism and jack about a center substantially coincident with the point of operation of the sewing mechanism upon the shoe.

32. An automatic shoe sewing machine, having, in combination, shoe sewing mechanism, a shoe supporting jack and mechanism acting automatically while the shoe is being sewn to impart tipping movements to the shoe sewing mechanism and turning movements to the jack, said tipping and turning movements taking place about a center substantially coincident with the point of operation of the sewing mechanism upon the shoe.

33. An automatic shoe machine, having, in combination, means for operating on a shoe, a shoe supporting jack, feeding mechanism acting always in a direction substantially parallel to the surface of the sole of a shoe placed upon the jack to feed the shoe, and means acting automatically to present successive portions of the shoe to the operating means.

34. An automatic shoe sewing machine, having, in combination, stitch forming devices, a shoe supporting jack, feeding mechanism acting always in a direction substantially parallel to the surface of the sole of a shoe placed upon the jack to feed the shoe, and means acting automatically to present successive portions of the shoe to the stitch forming devices.

35. An automatic shoe machine, having, in combination, means for operating on a shoe, a jack, mechanism for correcting the relative position of the operating means and the jack, driving mechanism therefor, tripping mechanism acting to throw the driving mechanism into operation at intervals as the point of operation of the operating means is transferred around the shoe, and means acting to automatically re-set the tripping mechanism and throw the driving mechanism out of action.

36. An automatic shoe machine, having, in combination, means for operating on a shoe, a jack, mechanism for correcting the relative position of the operating means and jack, a driving clutch therefor, tripping mechanism for controlling the engagement of the clutch, and mechanism operated through the clutch for re-setting the tripping mechanism and disengaging the clutch.

37. An automatic shoe machine, having, in combination, means for operating on a shoe, a jack, mechanism for correcting the relative position of the operating means and jack, a driving clutch therefor, a controller connected to move with the jack and provided with a series of trips, latching devices for preventing the engagement of the clutch connected to be tripped by the controller, and means acting to automatically re-set the latching devices and disengage the clutch.

38. An automatic shoe machine, having, in combination, means for operating on a shoe, a support for said operating means and a shoe supporting jack relatively movable to transfer the point of operation of said operating means around the shoe, and mechanism acting automatically as the point of operation of the operating means is transferred around the shoe to tip the support laterally with relation to the jack to correct the relative position of the shoe and operating means.

39. An automatic shoe machine, having, in combination, means for operating on a shoe, a support for said operating means and a shoe supporting jack relatively movable to transfer the point of operation of said means around the shoe, and mechanism acting automatically as the point of operation of the operating means is transferred around the shoe to tip the support laterally and longitudinally with relation to the jack to correct the relative position of the shoe and operating means.

40. An automatic shoe machine, having, in combination, means for operating on a shoe, a support for said means and a shoe supporting jack relatively movable to transfer the point of operation of said means around the shoe, mechanism for imparting relative tipping movements to the support and jack as the point of operation of the operating means is transferred around the shoe to correct the relative position of the operating means and shoe, and mechanism for automatically actuating the tipping mechanism.

41. An automatic shoe machine, having, in combination, means for operating on a shoe, a support for said means and a shoe supporting jack relatively movable and rotatable to transfer the point of operation of said means around the shoe, mechanism acting automatically as the point of operation of the operating means is transferred around the shoe to impart relative tipping movements to the supports and jack to correct the relative position of the operating means and shoe, and means for intermittently actuating said correcting mechanism as the point of operation is transferred around the shoe.

42. An automatic shoe machine, having, in combination, means for operating on a shoe, a support for said operating means and a shoe supporting jack relatively movable and rotatable to transfer the point of operation of said means around the shoe, and mechanism acting automatically and independently of the relative movement in transferring the point of operation around the shoe to move said support with relation to the jack about the point of operation of the operating means as a center as such means is transferred around the shoe to correct the relative position of the shoe and operating means.

43. An automatic shoe machine, having, in combination, means for operating on a shoe, a support for said operating means and a shoe supporting jack relatively movable and rotatable to transfer the point of operation of said operating means around the shoe, and mechanism acting automatically and independently of the relative movement in transferring the point of operation around the shoe to tip such support with relation to the jack about the point of operation of the operating means as a center, as such point is transferred around the shoe to correct the relative position of the shoe and the operating means.

44. An automatic shoe machine, having, in combination, means for operating on a shoe, a support for said operating means and a shoe supporting jack relatively movable and rotatable to transfer the point of operation of said operating means around the shoe, and mechanism acting automatically and independently of the relative movement in transferring the point of operation around the shoe to impart relative tipping movements to the support and jack about the point of operation as a center to correct the relative position of the shoe and operating means.

45. An automatic shoe sewing machine, having, in combination, sewing mechanism, a shoe supporting jack, feeding mechanism acting directly on the shoe, and mechanism acting automatically to impart relative tipping movements to the sewing mechanism and jack as the shoe is sewn, said mechanism coöperating with the feeding mechanism to properly present the shoe to the sewing mechanism.

46. An automatic shoe sewing machine, having, in combination, sewing mechanism, a shoe supporting jack, feeding mechanism acting directly on the shoe, and mechanism acting automatically while the shoe is being sewn to impart relative tipping movements to the sewing mechanism and jack about a center substantially coincident to the point of operation of the sewing mechanism upon the shoe.

47. The combination with an operating tool of a work carrier movable to transfer the point of operation of the tool around the shoe sole carried by the carrier, and mechanism including a cam and movable connections between the cam and work carrier operating automatically to impart to the work carrier lateral turning movements, determined in direction and extent by the cam to maintain the portion of the edge of the shoe sole in proximity to the tool parallel with the line of feed as the point of operation of the tool is transferred around the shoe.

48. The combination with an operating tool of a work carrier movable to transfer the point of operation of the tool around the shoe while carried by the carrier, mechanism for imparting lateral turning movements to the work to maintain a portion of the edge of the sole in proximity to the tool parallel with the line of feed, and mechanism for automatically actuating the work turning mechanism as the point of operation of the tool is transferred around the shoe sole.

49. The combination with a tool of a swinging arm, a second swinging arm mounted thereon, a work carrier rotatably mounted in the second arm, and mechanism acting independently of the feed to automatically turn the work carrier as the point of operation of the tool is transferred around a shoe sole on the carrier to maintain a portion of the edge of the sole in proximity to the tool parallel with the line of feed.

50. An automatic shoe machine, having, in combination, devices operating upon the marginal portion of a shoe sole including means for feeding the sole, and mechanism acting independently of the feed to turn the sole laterally.

51. An automatic shoe machine, having, in combination, means for operating on the marginal portion of a shoe sole, means for feeding the sole, and mechanism acting automatically at intervals during the transfer of the point o operation around the sole to turn the sole laterally to maintain its edge parallel to the line of feed.

52. The combination with an operating tool of a shoe supporting jack, movable to transfer the point of operation of the tool around the shoe, and mechanism including a cam and movable connections between the cam and the jack operating automatically to impart to the jack lateral turning movements, determined in direction and extent by the cam, to maintain the portion of the edge of the last or shoe sole in proximity to the tool parallel with the line of feed as the point of operation of the tool is transferred around the shoe.

53. The combination with an operating tool of a shoe supporting jack movable to transfer the point of operation of the tool around the shoe, mechanism for imparting to the jack lateral swinging movements to maintain a portion of the edge of the last or shoe sole in proximity to the tool parallel with the line of feed, and mechanism for automatically actuating the jack turning mechanism as the point of operation of the tool is transferred around the shoe.

54. An automatic shoe machine, having, in combination, feeding means acting to transfer the point of operation of the operating means along the work, and means acting independently of the feeding movement to relatively swing the feeding means and work, substantially as described.

55. An automatic shoe machine, having, in combination, a gage, a feeding mechanism acting to transfer the gage along the work, and mechanism for relatively swinging the feeding mechanism and work in accordance with its curvature to maintain the gage in engagement with the work, substantially as described.

56. An automatic shoe machine, having, in combination, means for operating on a shoe, a jack, mechanism for correcting the relative position of the operating means and jack, a driving mechanism therefor, and controlling mechanism acting to intermittently throw the driving mechanism into and out of operation as the point of operation of the operating means is transferred around the shoe, substantially as described.

In testimony whereof I affix my signature, in presence of two witnesses.

ERASTUS E. WINKLEY.

Witnesses:
FRED O. FISH,
ALFRED H. HILDRETH.

---

Copies of this patent may be obtained for five cents each, by addressing the "Commissioner of Patents, Washington, D. C."

---

Correction in Letters Patent No. 1,030,627.

It is hereby certified that in Letters Patent No. 1,030,627, granted June 25, 1912, upon the application of Erastus E. Winkley, of Lynn, Massachusetts, for an improvement in "Machines for Operating Upon Boots and Shoes," an error appears in the printed specification requiring correction as follows: Page 11, line 8, for the word "supports" read *support;* and that the said Letters Patent should be read with this correction therein that the same may conform to the record of the case in the Patent Office.

Signed and sealed this 13th day of August, A. D., 1912.

[SEAL]

E. B. MOORE,

*Commissioner of Patents.* transfer the point of operation of the tool around the shoe, and mechanism including a cam and movable connections between the cam and the jack operating automatically to impart to the jack lateral turning movements, determined in direction and extent by the cam, to maintain the portion of the edge of the last or shoe sole in proximity to the tool parallel with the line of feed as the point of operation of the tool is transferred around the shoe.

53. The combination with an operating tool of a shoe supporting jack movable to transfer the point of operation of the tool around the shoe, mechanism for imparting to the jack lateral swinging movements to maintain a portion of the edge of the last or shoe sole in proximity to the tool parallel with the line of feed, and mechanism for automatically actuating the jack turning mechanism as the point of operation of the tool is transferred around the shoe.

54. An automatic shoe machine, having, in combination, feeding means acting to transfer the point of operation of the operating means along the work, and means acting independently of the feeding movement to relatively swing the feeding means and work, substantially as described.

55. An automatic shoe machine, having, in combination, a gage, a feeding mechanism acting to transfer the gage along the work, and mechanism for relatively swinging the feeding mechanism and work in accordance with its curvature to maintain the gage in engagement with the work, substantially as described.

56. An automatic shoe machine, having, in combination, means for operating on a shoe, a jack, mechanism for correcting the relative position of the operating means and jack, a driving mechanism therefor, and controlling mechanism acting to intermittently throw the driving mechanism into and out of operation as the point of operation of the operating means is transferred around the shoe, substantially as described.

In testimony whereof I affix my signature, in presence of two witnesses.

ERASTUS E. WINKLEY.

Witnesses:
FRED O. FISH,
ALFRED H. HILDRETH.

---

Copies of this patent may be obtained for five cents each, by addressing the "Commissioner of Patents, Washington, D. C."

---

Correction in Letters Patent No. 1,030,627.

It is hereby certified that in Letters Patent No. 1,030,627, granted June 25, 1912, upon the application of Erastus E. Winkley, of Lynn, Massachusetts, for an improvement in "Machines for Operating Upon Boots and Shoes," an error appears in the printed specification requiring correction as follows: Page 11, line 8, for the word "supports" read *support;* and that the said Letters Patent should be read with this correction therein that the same may conform to the record of the case in the Patent Office.

Signed and sealed this 13th day of August, A. D., 1912.

[SEAL]

E. B. MOORE,

*Commissioner of Patents.*

It is hereby certified that in Letters Patent No. 1,030,627, granted June 25, 1912, upon the application of Erastus E. Winkley, of Lynn, Massachusetts, for an improvement in "Machines for Operating Upon Boots and Shoes," an error appears in the printed specification requiring correction as follows: Page 11, line 8, for the word "supports" read *support;* and that the said Letters Patent should be read with this correction therein that the same may conform to the record of the case in the Patent Office.

Signed and sealed this 13th day of August, A. D., 1912.

[SEAL.]

E. B. MOORE,
*Commissioner of Patents.*